United States Patent

Backlund et al.

[11] Patent Number: 5,746,886
[45] Date of Patent: May 5, 1998

[54] METHOD FOR THE RECOVERY OF ENERGY AND CHEMICALS FROM CELLULOSE SPENT LIQUOR CONTAINING POTASSIUM USING A GASIFIER

[75] Inventors: Åke Backlund, Karlstad; Lars Stigsson, Hammarö, both of Sweden

[73] Assignee: Kvaerner Pulping AB, Sweden

[21] Appl. No.: 491,893

[22] PCT Filed: Jan. 18, 1994

[86] PCT No.: PCT/SE94/00028

§ 371 Date: Jul. 14, 1995

§ 102(e) Date: Jul. 14, 1995

[87] PCT Pub. No.: WO94/17240

PCT Pub. Date: Aug. 4, 1994

[30] Foreign Application Priority Data

Jan. 25, 1993 [SE] Sweden ............................ 9300199

[51] Int. Cl.$^6$ ................................................ D21C 11/12
[52] U.S. Cl. ...................... 162/30.1; 162/30.11; 162/31
[58] Field of Search ............................ 162/30.1, 30.11, 162/31, 47; 423/DIG. 3

[56] References Cited

U.S. PATENT DOCUMENTS

| | | | |
|---|---|---|---|
| 3,020,195 | 2/1962 | Casciani et al. | 162/32 |
| 4,692,209 | 9/1987 | Santen et al. | 162/30.1 |
| 4,735,683 | 4/1988 | Wong et al. | 162/14 |
| 4,738,835 | 4/1988 | Kiiskila | 423/200 |
| 4,808,264 | 2/1989 | Kignell | 162/30.1 |

FOREIGN PATENT DOCUMENTS

| | | |
|---|---|---|
| 1109611 | 9/1981 | Canada. |
| 502052 | 5/1994 | European Pat. Off.. |
| 464921 | 1/1991 | Sweden. |
| 9108337 | 6/1991 | WIPO. |
| 9417240 | 8/1994 | WIPO. |

*Primary Examiner*—Donald E. Czaja
*Assistant Examiner*—Dean T. Nguyen
*Attorney, Agent, or Firm*—Farkas & Manelli; Jeff Melcher

[57] ABSTRACT

The present invention relates to a method for producing pulp cooked under alkaline conditions, in which method cellulose-containing material is brought into contact, in a digester, with an alkaline cooking liquor containing dissolved potassium and sodium compounds, with used spent cooking liquor being separated off from the cellulose-containing material and withdrawn for the recovery of energy and chemicals, wherein:

a) The molar ratio, calculated as K/K+Na, between potassium and sodium in a withdrawn spent cooking liquor exceeds 0.25.

b) The withdrawn spent cooking liquor is concentrated with respect to its content of solid material and is subjected to partial oxidation in a reactor, resulting in the formation of a, combustible gas which is withdrawn from the reactor.

c) oxygen-containing gas is supplied to the reactor in order to support the partial oxidation.

d) The operating temperature in the reactor is adjusted to between 400°–1200° C.

e) The combustible gas, which is obtained in association with the partial oxidation and which contains entrained solid and/or liquid alkali metal compounds, is separated from the major part of its content of alkali and used for the production of useful energy.

f) The alkali metal compounds which have been separated off from the process gas are dissolved in liquid, which liquid is used either wholly or in part for preparing cooking liquor.

13 Claims, No Drawings

METHOD FOR THE RECOVERY OF ENERGY AND CHEMICALS FROM CELLULOSE SPENT LIQUOR CONTAINING POTASSIUM USING A GASIFIER

DESCRIPTION

1. Technical Field

The present invention relates to a method for recovery of energy and chemicals from cellulose spent liquors having a high content of potassium, wherein the cellulose spent liquor is subjected to partial oxidation at 400°–1200° C. in a reactor, with evolution of a combustible gas and the potassium compounds formed under these conditions being separated and withdrawn from the combustible gas and dissolved in a liquid in order to prepare cooking liquor.

2. Background to the Invention

The closed effluent-free pulp mill has for a long time beckoned as being the final goal to satisfy all environmental demands. Naturally, such an installation is a physical impossibility, and the aim should therefore be to seek to limit the effluents to as great an extent as possible and convert them into a manageable form in order eventually to be able to return the residues to their source as a constituent part of the natural cycle.

In recent years, the introduction of modified cooking and oxygen bleaching, in combination with the use of chlorine dioxide for final bleaching, has, in a very striking manner, decreased the pulp mills effluents of chlorinated pollutants to the recipient.

The novel technique of bleaching entirely without the addition of chlorine chemicals, so-called TCF bleaching, based on final bleaching with peroxides in combination with ozone, will completely eliminate the effluents of organic chlorine compounds, thereby eliminating of one of the most serious environmental problems.

Another area of importance, which has attracted increasing interest in recent years, not least because of the significant costs which are associated with the chemical and biological purification of water, is that of also closing the mill with regard to COD and BOD effluents.

The trend towards increasing closure of the mill in conjunction with the production of pulp will in the future entail increasing potassium and chloride concentrations in the liquor system of the mill, something which in turn can lead to operational problems when conventional recovery technology is used, principally due to the smelt and corrosion properties of the potassium compounds.

During the seventies, an extensive programme was carried out in order to evaluate the completely closed kraft pulp mill at Great Lakes Forest Products Co in Canada. The effluent from both the chlorine and extraction stages in the bleaching plant was returned to the chemical recovery, after which the white liquor was concentrated by evaporation. Chlorides were bled off in conjunction with the evaporation.

Such a process has many advantages per se, due to the fact that effluents of BOD, COD, suspended solid material and toxic substances, such as chlorinated organic compounds, holistically summarized as AOX, can also be minimized or completely eliminated.

However, recycle countercurrent of the effluents to the recovery in this manner makes it necessary to resolve several issues which are crucial to the whole production process.

In the first place, non process elements will be enriched in the system, which substances must be bled out in one way or another, and, in the second, the loading on the recovery system will increase. Another issue which has to be dealt with relates to the water balance in the mill.

The experimental runs at Great Lakes, involving the recycle of chloride-containing bleaching plant effluents, gave rise to significant operational problems, chiefly due to the increasing content of chloride in the liquors, and the corrosion, which was related to this, in the white liquor evaporator and boiler system.

The chloride problem in conjunction with the return of bleaching plant effluents obviously disappears with TCF bleaching, a bleaching method which is to be preferred from other points of view as well.

Another option for achieving a high degree of mill closure, while retaining the need for evaporation, is based on the principle of returning all liquid countercurrent through the bleaching plant and in this way transferring both chemicals and released organic substance to the recovery. However, this method leads to other types of problem, including the build-up and enrichment of heavy metals in the bleaching plant to levels which become critical for the process.

One idea which is being discussed for dealing with unwanted enrichment in association with the countercurrent return of bleaching plant wash effluents is to purify process flows internally at carefully selected positions by introducing so-called kidneys and thereby separating material which is critical for the process. Such kidneys could, for example, consist of efficient filters or osmotic membranes. In this context, a prerequisite for efficiently separating the impurities is that it is mainly present in suspended form.

A common feature of all the abovementioned processes is the fact that potassium, which is supplied in considerable quantity together with the wood used as raw material, is enriched in the recovery system as the degree of closure increases. Potassium compounds are readily soluble in the alkaline liquids which are used in the process, and normally potassium follow sodium and sulphur, and are bled out from the modern mill principally through washing losses. Consequently, efforts to decrease the washing losses will cause the potassium content to increase in circulating liquors.

In today's modern "half-closed" mill, the molar ratio of potassium/sodium in the liquors, calculated as K/K+Na, is already approaching 0.20, which can cause a certain degree of interference with the process, principally in the recovery boiler.

The present invention relates to a method for producing pulp which is cooked in an alkaline manner using an integrated recovery system based on partial combustion of black liquors, in which method liquors having a high content of potassium do not interfere with the process.

It is previously well known to utilize potassium-based chemicals for producing chemical pulp.

For example, U.S. Pat. No. 3,020,195 describes a system for producing potassium carbonate in association with conventional pulp production using potassium-based cooking chemicals.

The system is based on wholly or partially using a conventional recovery boiler for producing cooking chemicals and potassium carbonate. It is indicated, inter alia, that a significant advantage of the system is the fact that the recovery boiler can be operated at a lower temperature owing to the lower fusion point of the potassium salts.

This contrasts completely with the recovery system in the present invention, in which system a combustible gas is generated under reducing conditions in a special reactor, which combustible gas is cleaned of its content of alkali and burnt under oxidizing conditions in a combustion chamber or boiler which is separate from the reactor. It is thereby possible to operate the oxidation process in the present invention at a high temperature, which has considerable advantages from the point of view of energy production.

U.S. Pat. No. 4,735,683 likewise describes a method for producing potassium salts in association with the production of sulphite pulp using potassium-based cooking chemicals. In this system as well, chemicals and energy are recovered using traditional technology in the form of a smelter furnace or fluid bed boiler working wholly or partially under oxidizing conditions, with consequent problems in the form of corrosion and the accretion of potassium compounds which fuse at low temperature.

CA 1,109,611 describes a potassium-based kraft pulp process in which chlorides are eliminated by evaporation and crystallizing from green liquor or white liquor. The recovery of energy and chemicals is said to be effected by combustion, with the formation of a smelt containing potassium carbonate. The patent specification does not describe the conditions under which the combustion takes place, nor is there any information on the production of a combustible gas in conjunction with the recovery, something which is an important feature of the present invention and enables efficient energy recovery, for example in an associated gas turbine plant.

DESCRIPTION OF THE INVENTION

The present invention thus relates to a cooking and chemical recovery system for preparing chemical pulp, which system is in the main potassium-based.

In present-day kraft mills, the concentration of potassium in the recovery cycle varies from mill to mill, mainly depending on the potassium content of the wood used as raw material and on the extent of mill closure.

The wood which is used as raw material contains on average 0.5–0.8 kg of potassium/ADTP, and even with limited closure of the mill the content of potassium in the liquors builds up to levels which are critical for operation of the recovery boiler. The content of sodium in the wood used as raw material is usually significantly lower, or on average 0.05–0.1 kg of sodium/ADTP.

It has been found that an increasing potassium/sodium ratio in the cooking liquors does not have any negative effect on the delignification process. If anything, the strength properties of the resulting pulp are improved under otherwise comparable conditions. Since the wood used as raw material itself contains significantly more potassium than sodium, it is natural to allow the potassium content to increase in the cooking and circulating liquors, provided the recovery problem can be solved, which is the aim of the present invention.

Several types of potassium-based cooking-chemical systems can conceivably be used when putting the present invention into practice, which systems include the conventional hydroxide/sulphide system, which is nowadays the system which completely dominates the kraft pulp industry. In another alternative, the cooking liquid can mainly consist of potassium hydroxide and/or potassium carbonate, where appropriate in the presence of one or more delignification catalysts, such as, for example, anthraquinone.

When recovering energy from black liquors having a high content of potassium, the distinguishing properties of potassium and sodium must be taken into account.

Potassium has a higher vapour pressure than sodium and, for this reason, the fine particles and aerosols which develop during gasification and combustion of black liquors have a higher K/Na ratio than that pertaining in smelt and black liquor.

One method of bleeding out potassium from present-day recovery systems is based on this fact and is carried out in practice by purging electrostatic filter ash which is also enriched with regard to chloride.

As the potassium content of the black liquor increases, the properties of the salt smelt also alter per se. Inter alia, the fusion point falls and the tendency of the dust carried over into the recovery boiler to form accretions increases. A high content of potassium in the black liquor can eventually limit the steam temperature in the recovery boiler to 450° C. or lower, due to minimize corrosion of the superheater tubes.

For these reasons, it would be desirable to use a recovery system which is less sensitive than is the conventional recovery boiler to this type of accretion-inclined dust and to chemical compositions which fuse at low temperatures.

Gasification of black liquor in suspension bed gasifiers has recently been developed and is being introduced commercially for conventional kraft spent liquors. This system is based on the fact that the inorganic fraction is entrained with the process gas in the form of an aerosol or smelt, which fraction is drawn off and separated from the gas phase by rapid cooling and dissolution in a liquid. Gasification systems which are particularly suitable for use when applying the present invention are described, inter alia, in U.S. Pat. No. 4,692,209 and SE-B-464921.

In the present invention, energy and chemicals are thus recovered from cellulose spent liquors having a high content of potassium by means of partial oxidation in a reactor while an oxygen-containing gas is being supplied. The temperature in the reactor is adjusted to between 400° C. and 1200° C., more preferably between 600° C. and 850° C.

The combustible gas which is formed in association with the partial oxidation is separated from its content of solid and/or liquid alkali metal compounds and finally oxidized at a high temperature in a combustion chamber connected to a steam/heating boiler or gas turbine.

The alkali metal compounds separated from the process gas are dissolved in a liquid, which liquid is used for preparing new cooking liquor.

The high content of potassium in the black liquor affects the ratio between the potassium sulphide and sodium sulphide formed in the reactor in a manner which is significant for the process in the present invention.

The surprisingly high affinity between sulphur and potassium under the pertaining gasification conditions results in the molar ratio between potassium sulphide and sodium sulphide, calculated as $K_2S/K_2S+Na_2S$, in the smelt or the separated alkali exceeding 0.4 when the potassium/sodium ratio in the black liquor, calculated as K/K+Na, barely exceeds 0.25. This in turn affects the fusion point. Eutectic mixtures in the system $K_2S$, $K_2CO_3$, $KCl$, $Na_2S$ and $Na_2CO_3$ fuse at temperatures which are even lower than 500° C.

It has also been known for a long time that potassium has a considerable catalytic effect in the gasification and combustion of carbon-containing fuels. In gasification processes, water and carbon dioxide react endothermally with carbon, resulting in the formation of high-quality gaseous fuels such as $H_2$ and $CH_4$, whereas oxygen which has been supplied reacts exothermally with carbon to give carbon monoxide and carbon dioxide.

The mechanism of the catalytic effect exerted by potassium in association with combustion/gasification is the subject of extensive studies of both theoretical and experimental nature. The view which currently prevails is that the potassium catalyst oscillates between two oxidation states during the reaction, thereby facilitating transport of the oxygen molecule from the gas phase to the reactive carbon surface.

Sodium compounds also have a catalytic effect, but this effect is not of the same order as that of potassium.

A good comprehensive description of the catalytic effect of potassium is provided in the following reference.

(Adsorption, desorption and reaction of oxygen containing molecules on clean and potassium covered carbon surfaces. P. Sjövall, Department of Physics PhD Thesis 1992, Chalmers, Gothenburg).

The catalytic effect of potassium, in combination with the smelt properties of potassium compounds, makes it possible to operate a suspension bed gasifier at a lower temperature, while retaining the degree of carbon conversion, than is possible with corresponding operation using a sodium-based system. This means either that the capacity in an existing gasification system can be increased or, alternatively, that the operating temperature can be lowered by almost 150° C., resulting in the production of a process gas of higher quality. These factors become of particular importance for the economy of the process in conjunction with pressurized gasification and recovery of energy in a gas turbine.

Assuming that the wood used as raw material is the principal source of supply of sodium, and taking into account the solubility of sodium salts in solutions having a high content of potassium, a green liquor or white liquor, respectively, is obtained having the following essential compositions when the present invention is applied using a recovery system, as described in SE-B-464921, in an otherwise conventional kraft pulp mill having a high degree of closure:

| Green liquor | | |
|---|---|---|
| Sulphide | 0.25–0.9 | molality |
| Carbonate | 1.2–1.8 | " |
| Chloride | 0.5–1.0 | " |
| Sulphate | 0.01–0.02 | " |
| K + Na | 3–7 | " |
| K/K + Na | 0.5–0.9 | molar ratio |
| White liquor | | |
| Hydroxide | 2.2–3 | molality |
| Sulphide | 0.25–0.9 | " |
| Carbonate | 0.1–0.4 | " |
| Chloride | 0.5–1.0 | " |
| Sulphate | 0.01–0.02 | " |
| K + Na | 3–7 | " |
| K/K + Na | 0.6–0.9 | molar ratio |

In the example below, the key data are shown for gasification of a potassium-based black liquor having a potassium/sodium molar ratio, calculated as K/K+Na, of 0.8. A system which is completely sodium-based is reproduced for comparison. The gasification is assumed to reach equilibrium in both cases.

| Example | | |
|---|---|---|
| Black liquor | | |
| Alkali metal base | Sodium base | K/Na + K = 0.9 |
| Flow kg TS/h | 1000 | 1178 |
| Kg TS/kg ADTP | 1.5 | 1.77 |
| Calorific value, calorimetrical (MJ/kg TS) | 14.4 | 12.3 |
| Air | | |
| Temperature °C. | 500 | 500 |
| Air factor | 0.415 | 0.375 |
| Reactor | | |
| Temperature °C. | 950 | 800 |
| Pressure, bar | 25 | 25 |
| Carbon conversion, % | 99.0 | 99.0 |
| Gas from the gasifier | | |
| CO % by vol. | 15.3 | 12.4 |
| $H_2$ " | 17.6 | 19.9 |
| $CH_4$ " | 0.05 | 1.12 |
| $CO_2$ " | 12.0 | 14.4 |
| $N_2$ " | balance | balance |
| $H_2S$ " | 0.7 | 0.5 |
| COS " | 0.03 | 0.015 |
| Gas flow $Nm^3/h$ | 2613 | 2551 |
| Calorific value | | |
| $MJ/Nm^3$ (dry gas) | 3.8 | 4.1 |
| Smelt from the gasifier | | |
| $Na_2CO_3$ % by weight | 71.3 | 6.6 |
| $Na_2S$ " | 20.0 | 0.6 |
| NaCl " | 0.7 | 0 |
| NaOH (C) " | 8.0 | 0.7 |
| $K_2CO_3$ | 0 | 63.3 |
| $K_2S$ | 0 | 26.0 |
| KCl | 0 | 0.6 |
| KOH | 0 | 2.2 |
| Smelt quantity kg/h | 420 | 642.4 |
| Calorific value in combustion gas | | |
| kw/ADTP (HHV) | 3940 | 4110 |

It has also been found that the solubility data for the system $KOH$—$K_2CO_3$$K_2SO_4$—$KCl$—$H_2O$ differ in a significant way from those of corresponding sodium systems.

The potassium carbonate is highly soluble in water, resulting in that the carbonate remains in solution even when present in high concentrations in green liquor/white liquor; this is in contrast to sodium carbonate, which tends to be precipitated from the solution at higher concentrations.

This fact leads to more favourable conditions for eliminating chlorides from the liquors in the form of potassium chloride. Such an elimination can be effected, for example, by bleeding off a relatively small quantity of green liquor/ white liquor which is then evaporated and separated from its content of chloride by leaching or by crystallization. Under these conditions, the evaporation of the green liquor/white liquor is carried out to an extent such that the quantity of potassium chloride which is bled off corresponds to the quantity of chloride which is supplied to the system in the wood used as raw material and in the make-up and, in the present case, in the chlorine chemicals which are recled from the bleaching plant.

An alkaline cooking and recovery system having mainly potassium as its base can thus, in this or another expedient manner, be supplemented with a system for eliminating chloride, if this should be found to be necessary.

The recovery system proposed in the present invention for cellulose spent liquors having a high potassium content can advantageously be integrated with the process described in SE-B-465039, in which sulphur compounds are supplied to the reactor in order to prevent carbonate formation. The principle is based on sulphur having a greater affinity for alkali metal than does carbon dioxide under the conditions pertaining in the reaction zone. Other possible additives having similar properties, and used with a view to limiting the formation of carbonate in the reactor, are certain metal oxides, principally titanium and manganese compounds.

We claim:

1. A method for producing pulp cooked under alkaline conditions in a digester and recovery of energy and chemicals produced from the spent cooking liquor generated in the digester, the method comprising the steps of:

treating a cellulose-containing material in the digester with an alkaline cooking liquor containing dissolved potassium and sodium compounds under conditions to produce pulp and spent cooking liquor;

separating out said spent cooking liquor from the pulp by withdrawing said spent cooking liquor from the digester, wherein the spent cooking liquor has a molar ratio between potassium and sodium of greater than 0.25 calculated as (moles potassium) divided by (sum of moles of potassium and moles of sodium);

concentrating said withdrawn spent cooking liquor with respect to its content of solid material;

subjecting said concentrated spent cooking liquor to partial oxidation in a gasifying reactor, resulting in the formation of a combustible gas which contains entrained solid and/or liquid alkali metal compounds;

supplying an effective amount of oxygen-containing gas to the reactor to support the partial oxidation;

adjusting an operating temperature in the reactor to between 400° and 900° C., whereby said solid and/or liquid alkali metal compounds have a molar ratio between potassium sulfide and sodium sulfide of greater than 0.4. calculated as (moles of potassium sulfide) divided by (sum moles of potassium sulfide and moles of sodium sulfide);

withdrawing said combustible gas containing said alkali metal compounds from the reactor;

separating said alkali metal compounds from said combustible gas by bringing said combustible gas into direct contact with a cooling liquid, in which cooling liquid the alkali metal compounds are soluble to form a liquid containing said alkali metal compounds;

using said liquid containing alkali metal compounds either wholly or in part for preparing said alkaline cooking liquor; and using said combustible gas for the production of useful energy.

2. Method according to claim 1, wherein the molar ratio, calculated as K/(K+Na), between potassium and sodium in said withdrawn spent cooking liquor exceeds 0.4.

3. Method according to claim 1, wherein the quantity of oxygen-containing gas supplied to the reactor corresponds to between 20 and 80% of the stoichiometric requirement for complete oxidation of the cooking liquor.

4. Method according to claim 1, wherein the operating temperature in the reactor is adjusted to between 600° and 850° C.

5. Method according to claim 1, wherein chloride-containing impurities are separated from potassium-containing liquids which occur in the system by evaporation and/or leaching/crystallization.

6. Method according to claim 1, wherein an alkaline cooking liquor entering the digester mainly consists of dissolved alkali hydroxides and alkali metal hydrogen sulphides.

7. Method according to claim 1, wherein an alkaline cooking liquor entering the digester mainly consists of dissolved alkali metal hydroxides and/or alkali metal carbonates.

8. Method according to claim 1, wherein the used potassium-containing spent cooking liquor is subjected to partial oxidation in a reactor in the presence of one or more sulphur compounds, which compounds are supplied to the reactor after having been withdrawn from sulphur-containing material or gas flows occurring in the cellulose mills.

9. Method according to claim 8, wherein sulphur compounds which are supplied to the reactor mainly consist of a gas containing hydrogen-sulphide.

10. Method according to claim 8, wherein sulphur compounds which are supplied are to the reactor mainly consist of a sulphite or sulphate salt.

11. Method according to any one of the preceding patent claims, wherein the used potassium-containing spent cooking liquor is subjected to partial oxidation in a reactor in the presence of one or more metal oxides.

12. Method according to claim 11, wherein the metal oxide mainly consists of oxides of titanium, manganese, magnesium or calcium.

13. Method according to claim 1, wherein the molar ratio, calculated as K/(K+Na), between potassium and sodium in said withdrawn spent cooking liquor is greater than 0.6.

* * * * *